United States Patent [19]
Purtell

[11] 3,798,738
[45] Mar. 26, 1974

[54] MUSHROOM VALVE STUFFER
[75] Inventor: Rufus J. Purtell, Brownfield, Tex.
[73] Assignee: Tri-Matic, Inc., Brownfield, Tex.
[22] Filed: May 30, 1972
[21] Appl. No.: 258,021

[52] U.S. Cl............................ 29/213, 29/235, 29/267
[51] Int. Cl............................................. B25b 27/24
[58] Field of Search .......... 29/235, 213, 221.5, 451, 29/267; 81/15.2, 15.7

[56] References Cited
UNITED STATES PATENTS

| | | | |
|---|---|---|---|
| 1,474,227 | 11/1923 | Boisset | 29/235 X |
| 651,267 | 6/1900 | Picket | 29/235 |
| 1,803,491 | 5/1931 | Thiry | 29/235 X |
| 1,329,524 | 2/1920 | Hill | 29/235 X |
| 3,034,206 | 5/1962 | Kominic | 29/235 X |

Primary Examiner—Othell M. Simpson
Assistant Examiner—Harold P. Smith, Jr.
Attorney, Agent, or Firm—Wendell Coffee

[57] ABSTRACT

Rubber mushroom-shaped, self-draining valves are rammed by a creased ram into holes in irrigation pipe through a slotted funnel.

14 Claims, 5 Drawing Figures

MUSHROOM VALVE STUFFER

BACKGROUND OF THE INVENTION

1. Field of the Invention

This invention relates to assembling rubber mushroom valves into holes in pipe.

2. Description of the Prior Art

Self-draining rubber mushroom-shaped valves are well known to the irrigation art. E.g., U.S. Pat. No. 2,646,059 to WHITTNER et al. discloses drain valves which are made of resilient, pliable material such as rubber and which have a cap on one end and a flange on the other and a stem connecting the two. These are placed through a hole in a pipe so when there is a pressure within the pipe, the cap flattens out against the pipe, sealing it, but when the pressure is released, the resilience of the rubber causes the cap to form a bridge across the curved surface, permitting water to run out of the pipe.

I have filed a patent application in the U.S. Patent Office entitled MUSHROOM-SHAPED DRAIN VALVE, Ser. No. 235,921, on March 20, 1972, covering a modification of this type valve.

It will be understood, of course, that if the hole is near the end of the pipe, the logical way to install these valves is to place the valve inside the pipe by hand and force the flange, which is smaller than the cap, through the hole and then the valve is in position. However, it is often desirable to place these valves at midpoint of a 20 to 30 foot section of pipe. In such an instance, the installation procedure is much more difficult. According to present practice, a wire is inserted from the outside through the hole to the inside of the pipe. The wire has a hook upon the end thereof, somewhat resembling a miniature shepherd's crook. The crook is then fitted around the stem of the valve adjacent to the flange and the wire pulled back through the hole, pulling the flange through the hole. This is a time consuming operation. However, this is the way the valves are installed in commercial practice at the present time.

SUMMARY OF THE INVENTION

1. New and Different Function

According to this invention, the valve is stuffed into the hole in the pipe from the outside of the pipe, stuffing the cap through the hole. This is done by stuffing it through a slotted funnel or a cone-shaped guide or tapered guide. The guide is placed over the hole with the spout of the funnel inserted through the hole. Then, the valve is stuffed or rammed through the funnel and the cap rammed through the hole. The cap folds as it slides down the funnel. The stem extends through the slot in the funnel and the flange never never enters the funnel. The stem stretches during installation.

Therefore, it may be seen that it is immaterial as to where the hole is located in the pipe; it is just as easy to place the valve in the pipe through a hole in the middle of the pipe as it is adjacent to one of the ends.

2. Objects of the Invention

An object of this invention is to place mushroom-shaped self-draining rubber valves into holes in irrigation pipe.

Further objects are to achieve the above with a device that is sturdy, compact, durable, lightweight, simple, safe, efficient, and reliable, yet inexpensive and easy to manufacture, operate, and maintain.

Still further objects are to achieve the above with a method that is rapid, efficient, and inexpensive and does not require skilled people to adjust, operate, and maintain.

The specific nature of the invention, as well as other objects, uses, and advantages thereof, will clearly appear from the following description and from the accompanying drawing, the different views of which are not necessarily to the same scale.

DESCRIPTION OF THE PREFERRED EMBODIMENT

Figure 5:
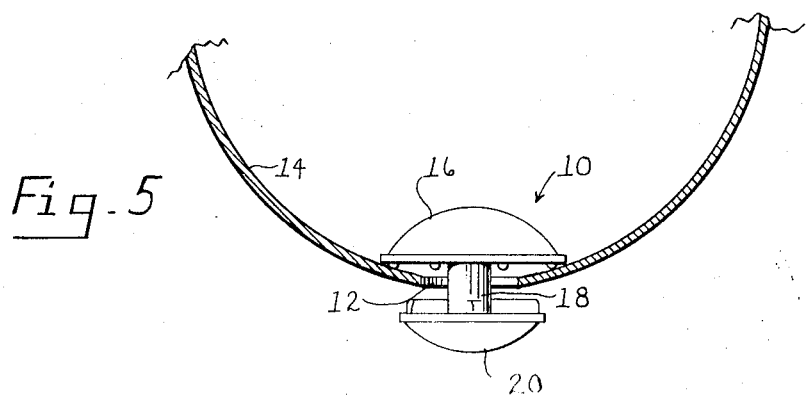
FIG. 5 is a sectional view of the pipe with the valve in place.

As stated above, the object of this invention is to place valve 10 through hole 12 in pipe 14 (FIG. 5). The valve includes cap 16 which, in the finished position, is within the pipe 14. The cap is connected by stem 18 to flange 20, which is outside of the pipe. The cap and flange are both larger than the hole 12.

Funnel 22 is used to insert the valve 10. The funnel is mounted upon arc 24. The arc 24 securely clamps the funnel to the pipe by clamp 26. Clamp 26 is attached by adjustable bolt 28 to arm 30, which is clamped in place by toggle arm 32. Inasmuch as the entire function of the arc 24, the clamp 26, bolts 28, arm 30, and toggle arm 32, are to hold the funnel 22 in position, they are not explicity described here. Those skilled in the art will understand how to construct clamps to hold items securely upon a pipe and they will also understand that other means could be used. E.g., the arc 24 could be held in place by straps which extend around the pipe.

Figure 4:
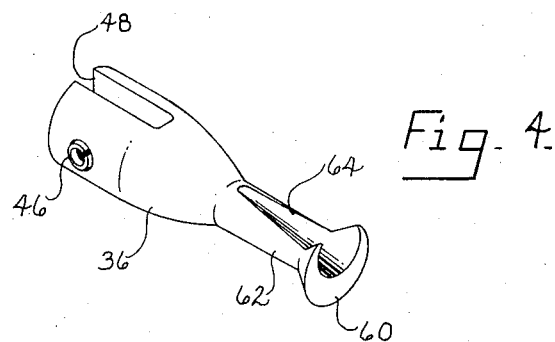
FIG. 4 is a perspective view of the ram.

Brace 34 extends longitudinally along the pipe to hold the funnel 22 in an upright position when the ram 36 is being forced downward by ram lever 38. The ram lever 38 has a bifurcated portion which is pivoted by pin 40 to the funnel 22 by extensions 42. The ram 36 is itself pivoted to knuckle 44 by knuckle pin 46 which extends through an upper bifurcated portion 48. The knuckle 44 is a rigid part of the lever 38. Stop 50, a part of ram 36 (not shown in FIG. 4), straddles the bifurcation 48.

Figure 1:
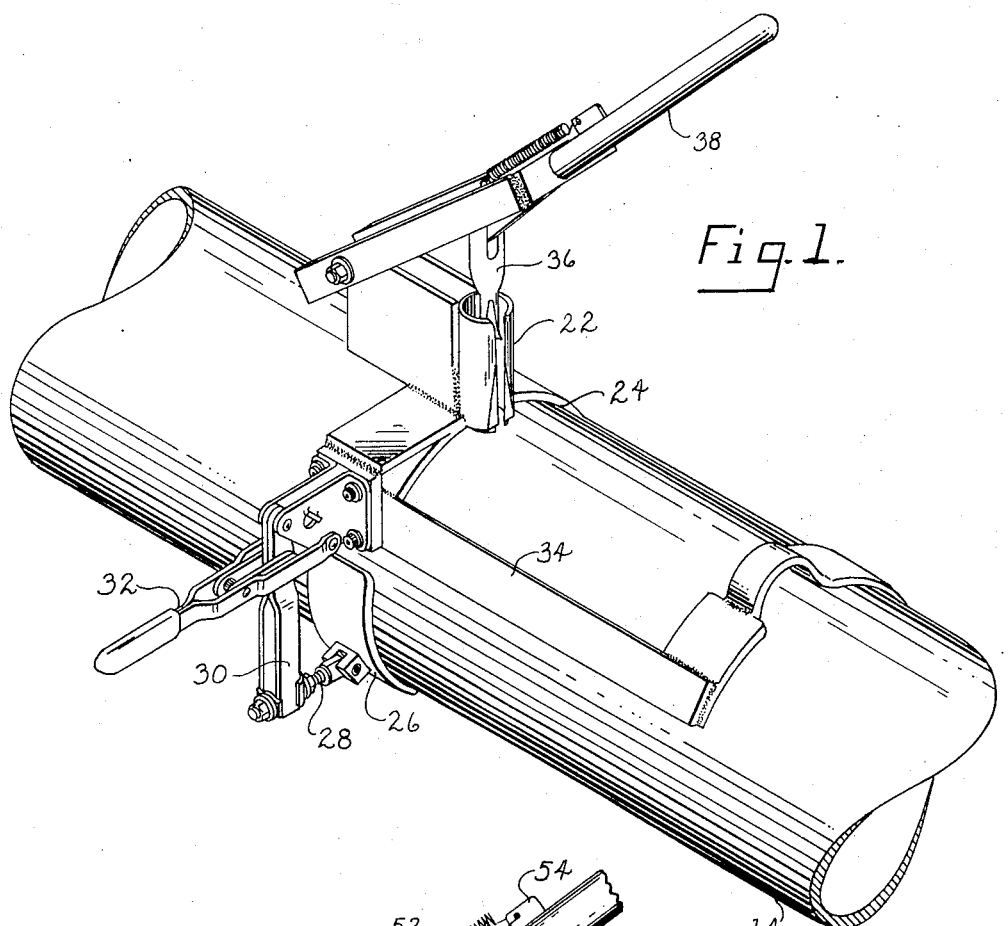
FIG. 1 is a perspective view of a device used in this invention shown clamped in place on the pipe.
Figure 2:
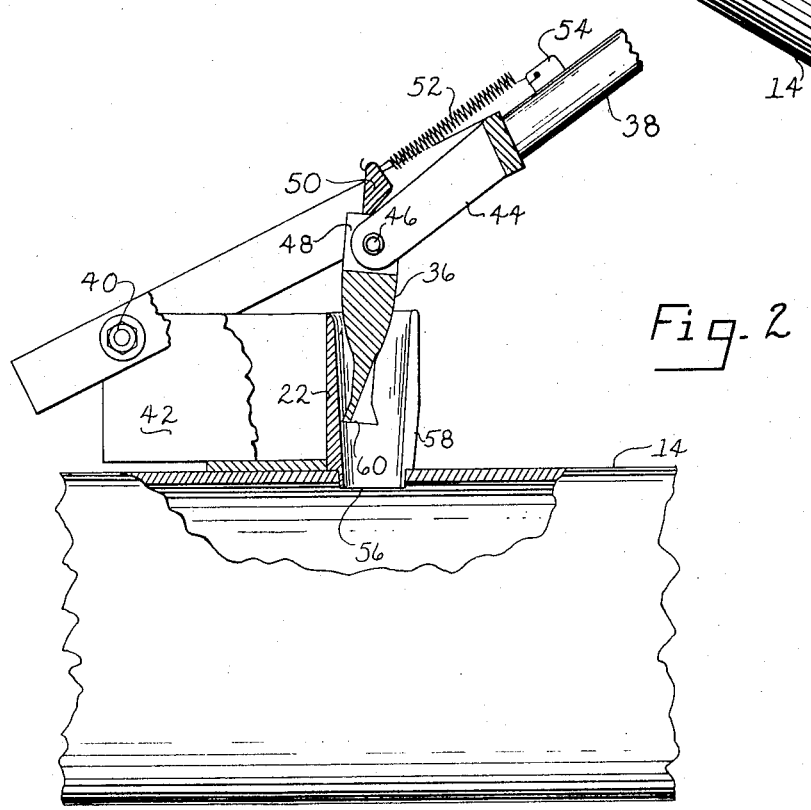
FIG. 2 is a side elevational view partially cut away and in section, showing the operation thereof.
Figure 3:
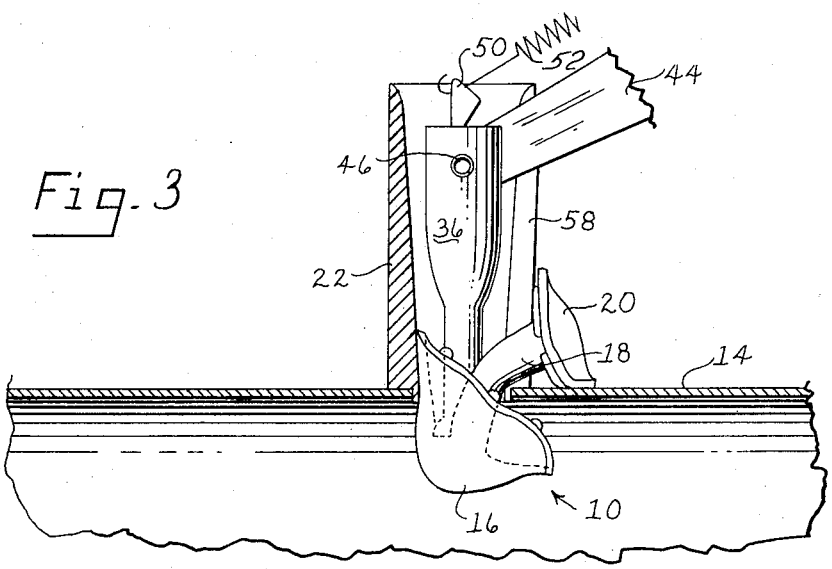
FIG. 3 is a sectional view, showing the funnel and ram as it would push a mushroom valve into position.

Helical tension spring 52 extends from stop 50 to ear 54 upon the lever 38. The spring 52 biases the ram 36 so the lower part of the ram 36 is urged to the left or clockwise as seen in FIGS. 1, 2, and 3, however, the limit to which ram is biased in this direction is limited by the stop 50 striking the knuckle 44, the upper surface of the knuckle 44 forming a shoulder in this regard. The axis of the funnel 22 when attached as described above is normal or at right angles to the axis of the pipe 14. The funnel 22 has spout 56 which inserts through the hole 12.

The funnel 22 is referred to here as a funnel, however, it might be more accurate to describe it as a guide with a conic interior or a guide having a tapered bore.

The funnel 22 has longitudinal slot 58 extending the full length of the funnel so the funnel is entirely open from one side. The width of the slot is substantially equal to the diameter of the stem 18 of the valve 10.

The lower portion of the ram 36 has enlarged head 60 to form as large bearing surface against the valve 10 as it is being inserted. Immediately above the head 60, the ram has neck 62 of smaller diameter so the excess material of the valve is not compressed more than necessary. The desirability of having the smaller diameter neck is clearly seen in FIG. 3. The neck 62 has axial crease 64 as illustrated. Likewise referring to FIG. 3, it may be seen that the stem 18 of the valve 10 fits into the crease 64 in operation.

OPERATION

To insert the valve 10 into the hole 12 of the pipe 14 according to this invention, the funnel 22 is attached to the pipe. The funnel is placed upon the pipe with the spout 56 in the hole 12 and the funnel clamped securely in place by operation of the toggle arm 32.

Then the valve 10 is thoroughly lubricated (with liquid soap for example) and the cap 16 of the valve is placed in the upper portion of the funnel 22 with the stem 18 through the slot 58. The ram 36 is lowered so the head 60 fits against the stem 19 adjacent to where the stem attaches to the cap 16 and then by operation of the ram lever 38, the ram is lowered to ram the valve down the funnel so the cap passes through the hole 12. This is the position as shown in FIG. 3 at the end of the first stroke of the ram.

As seen in FIG. 3, when the cap goes through the hole 12 in the pipe 14, the stem 18 is stretched considerably and the flange 20 still extends on the outside of the funnel 22.

Thereafter, the ram 36 is raised. When the ram is raised, the spring 52 will bias the ram so tha head 60 rides against the side of the funnel 22 opposite from the slot 58.

Then the ram 36 is forced downward again. This time the head 60 will contact a portion of the cap 16 and complete the process of forcing the cap 16 through the hole 12.

Thereafter the clamp 26 is released by the operation of the toggle arm 32 and the funnel 22 removed. When the funnel 22 is removed, the stem 18 of the valve 10 pulls through the slot 58.

Thus it may be seen that I have accomplished the objective of installing the valve 10 through the hole 12 of the pipe 14.

The embodiment shown and described above is only exemplary. I do not claim to have invented all the parts, elements or steps described. Various modifications can be made in the construction material, arrangement, and operation, and still be within the scope of my invention. The limits of the invention and the bounds of the patent protection are measured by and defined in the following claims. The restrictive description and drawing of the specific example above do not point out what an infringement of this patent would be, but are to enable the reader to make and use the invention.

I claim as my invention:

1. A device and a mushroom valve for stuffing the mushroom valves into holes in a pipe comprising:
   a. the valves
      i. being rubber, with
      ii. a cap upon one end of
      iii. a stem and
      iv. a flange upon the other end of the stem,
   b. the valves placed into the pipe with
      i. the cap within the pipe,
      ii. the flange outside the pipe, and
      iii. the stem through the hole, the hole being smaller than the cap and flange;
   d. a funnel, having
      i. a spout, and
      ii. the funnel adapted to be attached to the pipe with
      iii. the spout extending into
      iv. the hole in the pipe, and
   e. a ram mounted for reciprocal movement on the funnel,
   f. so that the cap of the valve placed in the funnel may be rammed through the hole,
   g. clamp means attached to the funnel for attaching the funnel to the pipe.

2. A device and a mushroom valve for stuffing the mushroom valves into holes in a pipe comprising:
   a. the valves
      i. being rubber, with
      ii. a cap upon one end of
      iii. a stem and
      iv. a flange upon the other end of the stem,
   b. the valves placed into the pipe with
      i. the cap within the pipe,
      ii. the flange outside the pipe, and
      iii. the stem through the hole, the hole being smaller than the cap and flange;
   d. a funnel, having
      i. a spout, and
      ii. the funnel adapted to be attached to the pipe with
      iii. the spout extending into
      iv. the hole in the pipe, and
   e. a ram mounted for reciprocal movement on the funnel,
   f. so that the cap of the valve placed in the funnel may be rammed through the hole,
   g. said ram having a crease therein so when the head of the ram bears against the cap of the valve, the stem of the valve fits in the crease of the ram.

3. A device and a mushroom valve for stuffing the mushroom valves into holes in a pipe comprising:
   a. the valves
      i. being rubber, with
      ii. a cap upon one end of
      iii. a stem and
      iv. a flange upon the other end of the stem,
   b. the valves placed into the pipe with
      i. the cap within the pipe,
      ii. the flange outside the pipe, and
      iii. the stem through the hole, the hole being smaller than the cap and flange;
   d. a funnel, having
      i. a spout, and
      ii. the funnel adapted to be attached to the pipe with
      iii. the spout extending into
      iv. the hole in the pipe, and
   e. a ram mounted for reciprocal movement on the funnel,
   f. so that the cap of the valve placed in the funnel may be rammed through the hole,
   g. a slot extending the full length of the funnel 4. The invention as defined in claim 3 with an additional limitation of
   j. clamp means attached to the funnel for attaching the funnel to the pipe.
5. The invention as defined in claim 3 with an additional limitation of
   j. said ram having a crease therein so when the head of the ram bears against the cap of the valve, the stem of the valve fits in the crease of the ram.
6. The invention as defined in claim 3 wherein the ram is pivoted to
   j. a lever attached to the funnel and
   k. a spring connected to the lever and the ram biases the ram toward the side of the funnel opposite the slot.
7. The invention as defined in claim 6 with an additional limitation of
   m. said ram having a crease therein so when the head of the ram bears against the cap of the valve, the stem of the valve fits in the crease of the ram.
8. The invention as defined in claim 7 with an additional limitation of
   n. clamp means attached to the funnel for attaching the funnel to the pipe.
9. The invention as defined in claim 8 with an additional limitation of
   o. a shoulder on the lever which contacts the ram to limit the movement of the ram resulting from the bias of the spring.
10. A method for stuffing mushroom valves into holes in a pipe,
    a. the valves
       i. being rubber, with
       ii. a cap upon one end of
       iii. a stem and
       iv. a flange upon the other end of the stem,
    b. the valves placed into the pipe with
       i. the cap within the pipe,
       ii. the flange outside the pipe, and
       iii. the stem through the hole, the hole being smaller than he cap anf flange;
    c. said method utilizing a funnel with a spout,
    d. said method comprising the following steps:
    e. placing the spout of the funnel in the hole in the pipe,
    f. placing one of said valves in funnel, then
    g. ramming the cap of the valve through the spout and thus through the hole, and thereafter
    h. removing the funnel from the hole,
    j. the method utilizing a ram and the ram has a crease therein so that as the valve is rammed into the hole, the stem of the valve fits into the crease of the ram.
11. A method for stuffing mushroom valves into holes in a pipe,
    a. the valves
       i. being rubber, with
       ii. a cap upon one end of
       iii. a stem and
       iv. a flange upon the other end of the stem,
    b. the valves placed into the pipe with
       i. the cap within the pipe,
       ii. the flange outside the pipe, and
       iii. the stem through the hole, the hole being smaller than the cap and flange;
    c. said method utilizing a funnel with a spout,
    d. said method comprising the following steps:
    e. placing the spout of the funnel in the hole in the pipe,
    f. placing one of said valves in funnel, then
    g. ramming the cap of the valve through the spout and thus through the hole, and thereafter
    h. removing the funnel from the hole,
    j. the method utilizing a funnel with a slot extending the full length thereof, and the step of placing the valve in the funnel is by
    k. placing
       i. the cap of the valve in the funnel,
       ii. the stem in the slot,
       iii. the flange outside the funnel, and
    m. pulling the stem through the slot as the funnel is removed from the hole.
12. The invention as defined in claim 11 with additional limitations of
    n. folding the cap as it slides down the funnel, and
    o. stretching the stem.
13. The invention as defined in claim 12 wherein the method utilizes a ram and the ram has a crease therein so that as the valve is rammed into the hole, the stem of the valve fits into the crease of the ram.
14. The invention as defined in claim 13 wherein the ramming utilizes a ram and is done as follows:
    o. first the ram is placed on the stem near the cap and rammed down, then
    p. released, then
    q. the ram is placed on the edge of the cap and rammed down again.

* * * * *